US010936675B2

(12) United States Patent
High et al.

(10) Patent No.: US 10,936,675 B2
(45) Date of Patent: Mar. 2, 2021

(54) DEVELOPING AN ITEM DATA MODEL FOR AN ITEM

(71) Applicant: Walmart Apollo, LLC, Bentonville, AR (US)

(72) Inventors: Donald High, Noel, MO (US); Gary Dewayne Griggs, Cave Springs, AR (US); Michael Dean Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 293 days.

(21) Appl. No.: 15/379,305

(22) Filed: Dec. 14, 2016

(65) Prior Publication Data

US 2017/0177725 A1   Jun. 22, 2017

Related U.S. Application Data

(60) Provisional application No. 62/268,724, filed on Dec. 17, 2015.

(51) Int. Cl.
*G06F 16/951* (2019.01)
*G06F 16/28* (2019.01)
(Continued)

(52) U.S. Cl.
CPC .......... *G06F 16/951* (2019.01); *G06F 16/285* (2019.01); *G06F 30/00* (2020.01); *G06Q 30/06* (2013.01); *G06F 2111/20* (2020.01)

(58) Field of Classification Search
CPC .. G06F 17/30864; G06F 16/951; G06F 30/00; G06F 16/285; G06F 2111/20;
(Continued)

(56) References Cited

U.S. PATENT DOCUMENTS 6,519,602 B2   2/2003 Sundaresan et al.
6,901,399 B1   5/2005 Corston et al.
(Continued)

FOREIGN PATENT DOCUMENTS

WO       2000042544        7/2000
WO    WO-2015139119 A1 *  9/2015   ............. G07C 13/00

OTHER PUBLICATIONS

Web Crawling, Christopher Olston and Marc Najork, 2010.
(Continued)

*Primary Examiner* — David T. Brooks
(74) *Attorney, Agent, or Firm* — Patterson Thuente Pedersen, P.A.

(57) ABSTRACT

The present invention extends to methods, systems, and computer program products for developing an item data model for an item. Aspects of the invention can automate the process of data collection of "facts" for "items" that information is needed about. Facts can be organized and normalized to eliminate redundant facts, and interpret what is found. Data requirements extraction and automated modeling using a combination of data virtualization, data analytics, extract, transform, and load (ETL), web crawlers, and reverse engineering systems, can be used along with other technologies to develop an item model. A model owner feeds a curating module with the information for locating the facts to be used, and initiating the modeling process. Existing data structures, websites, vendor input, etc. can be described to the import process, and an item model is produced. The model can be imported into existing modeling tools for viewing, or viewed as XML.

20 Claims, 7 Drawing Sheets

(51) Int. Cl.
*G06Q 30/06* (2012.01)
*G06F 30/00* (2020.01)
*G06F 111/20* (2020.01)

(58) Field of Classification Search
CPC ........... G06Q 30/0601; G06Q 30/0603; G06Q 30/0621; G06Q 30/0623; G06Q 30/0627; G06Q 30/0641; G06Q 30/06
See application file for complete search history.

(56) References Cited

U.S. PATENT DOCUMENTS

| | | | |
|---|---|---|---|
| 7,076,484 B2 | 7/2006 | Dworkis et al. | |
| 7,949,691 B1 * | 5/2011 | Franciscus de Heer | G06Q 30/0603 707/791 |
| 8,156,073 B1 * | 4/2012 | Dave | G06F 17/30528 707/602 |
| 8,458,054 B1 * | 6/2013 | Thakur | G06Q 30/0603 705/27.1 |
| 8,468,244 B2 | 6/2013 | Redlich et al. | |
| 8,886,589 B2 | 11/2014 | Surendran et al. | |
| 10,235,449 B1 * | 3/2019 | Viswanathan | G06F 17/218 |
| 2002/0124005 A1 * | 9/2002 | Matson | G06Q 30/06 |
| 2003/0126139 A1 * | 7/2003 | Lee | G06F 17/2247 |
| 2004/0143600 A1 * | 7/2004 | Musgrove | G06F 17/30864 |
| 2007/0198727 A1 | 8/2007 | Guan | |
| 2007/0288506 A1 * | 12/2007 | Matson | G06Q 30/06 |
| 2008/0256028 A1 * | 10/2008 | Kruger | G06Q 30/02 |
| 2009/0198594 A1 * | 8/2009 | Lu | G06Q 30/0601 705/26.1 |
| 2009/0228428 A1 * | 9/2009 | Dan | G06F 17/30997 |
| 2011/0173131 A1 * | 7/2011 | Huang | G06Q 30/02 705/347 |
| 2011/0264598 A1 * | 10/2011 | Fuxman | G06Q 30/0281 705/343 |
| 2013/0198183 A1 * | 8/2013 | Clendinning | G06Q 30/02 707/736 |
| 2013/0238621 A1 * | 9/2013 | Ganjam | G06F 16/2465 707/737 |
| 2013/0311875 A1 * | 11/2013 | Pappas | G06F 17/2247 715/234 |
| 2013/0332460 A1 * | 12/2013 | Pappas | G06F 17/30705 707/740 |
| 2014/0040223 A1 * | 2/2014 | Andreasen | G06F 17/30861 707/705 |
| 2015/0006333 A1 * | 1/2015 | Silveira | G06F 17/3089 705/27.1 |
| 2015/0286988 A1 * | 10/2015 | Ogrinz | G06Q 10/10 705/345 |
| 2015/0378975 A1 * | 12/2015 | Wu. | G06F 17/243 715/226 |
| 2018/0329873 A1 * | 11/2018 | Butyugin, IV | G06F 40/154 |

OTHER PUBLICATIONS

Scalable Mining of Large Disk-based Graph Databases, Fudan University, China.
Knowledge Graph.

* cited by examiner

DEVELOPING AN ITEM DATA MODEL FOR AN ITEM

CROSS-REFERENCE TO RELATED APPLICATIONS

This application claims the benefit of U.S. Provisional Patent Application 62/268,724 filed Dec. 17, 2015, and titled "Developing An Item Data Model For An Item", the entire contents of which are hereby incorporated herein by reference.

BACKGROUND

1. Field of the Invention

This invention relates generally to the field of automated data gathering, and, more particularly, to automatically developing item data models for items.

2. Related Art

Retailers often maintain databases of the products that they offer to consumers. The databases can contain information utilized by both the consumers and retailer personnel.

From a consumer perspective, the databases can contain such information as product descriptions, product specifications, pricing, consumer reviews, store availability, etc. Consumers can utilize the information contained within these databases during their online shopping activities to help in their product research and to make decisions whether or not to buy a particular product.

Traditionally, databases have been relatively static in nature and have contained finite amounts of information related to a product. In the early days of online purchasing, websites were somewhat restrictive, offering only basic elements relating to a product such as the product price and technical specification information. Over the years, additional content has been added, including images of products and consumer reviews. Consumers can utilize this additional information to help in their decisions regarding which products and/or services to purchase.

Many consumers also utilize additional web resources to research potential products for purchase. They may go directly to vendor websites, perform general Internet searches, and/or turn to social media for any details related to an item being considered for purchase. As the volume of data available via the Internet has grown, more and more information exists related to the various products. Many consumers put in a significant amount of time to research products before they make the decision whether or not to purchase the item.

One of the difficulties of researching products via the Internet is that large numbers (e.g., potentially on the order of millions) of results can be returned from a web search. Further, although many of the results may be redundant, it is virtually impossible for a consumer to manually filer out redundant results. Additionally, if a consumer is searching for a certain attribute or description of a product, it may be difficult to sort through the millions of results to find the specific pieces of information that the consumer is interested in.

From a retailer personnel perspective, the databases can contain such information as manufacturer or vendor contact information, wholesale pricing, lead times, etc. Retailer personnel, for example, those involved in supply chain logistics, can utilize the information contained within these databases to help facilitate the procurement and distribution of these products.

Typically, product attributes are manually collected and managed from multiple different sources. However, many retailers offer thousands or millions of products. In general, since the process is manual, the information that can be maintained for products and therefore provided to customers is limited. For example, it can be very difficult and time consuming to tailor a database structure to adequately contain the necessary records and fields for the thousands or millions of unique products a store may be selling. It can also be very difficult and time consuming to identify relevant updates to item data and incorporate the relevant updates into the item data.

As such, for most item database systems, it becomes a very tedious and slow process to modify a database structure used across system domains. For example, if it were determined that additional information about some item (e.g., a coffee maker) was to be stored, multiple organizations would get involved, and a long tedious process would be necessary to add a new "fact" into the database.

Additionally, in the case of an "item file", information that is relevant for one set of merchandise is different than what is relevant for others. In fact, for many retailers, there are so many item groups for data modelers to absorb and model, it can be difficult to maintain a necessary level of detail to support customer's hunger for information about products. For example, facts about a particular appliance are much different than facts required for tires, diapers, light bulbs, etc. However, customers need to be able to search on even the lowest of details, such as lumens, tire rim sizes, absorbency, etc.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for developing an item data model for an item.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, aspects of the invention are directed to developing an item data model for an item. Aspects of the invention can automate the process of data collection of "facts" for "items" that information is needed about. Facts can be organized and normalized to eliminate redundant facts, and interpret what is found.

Figure 1:
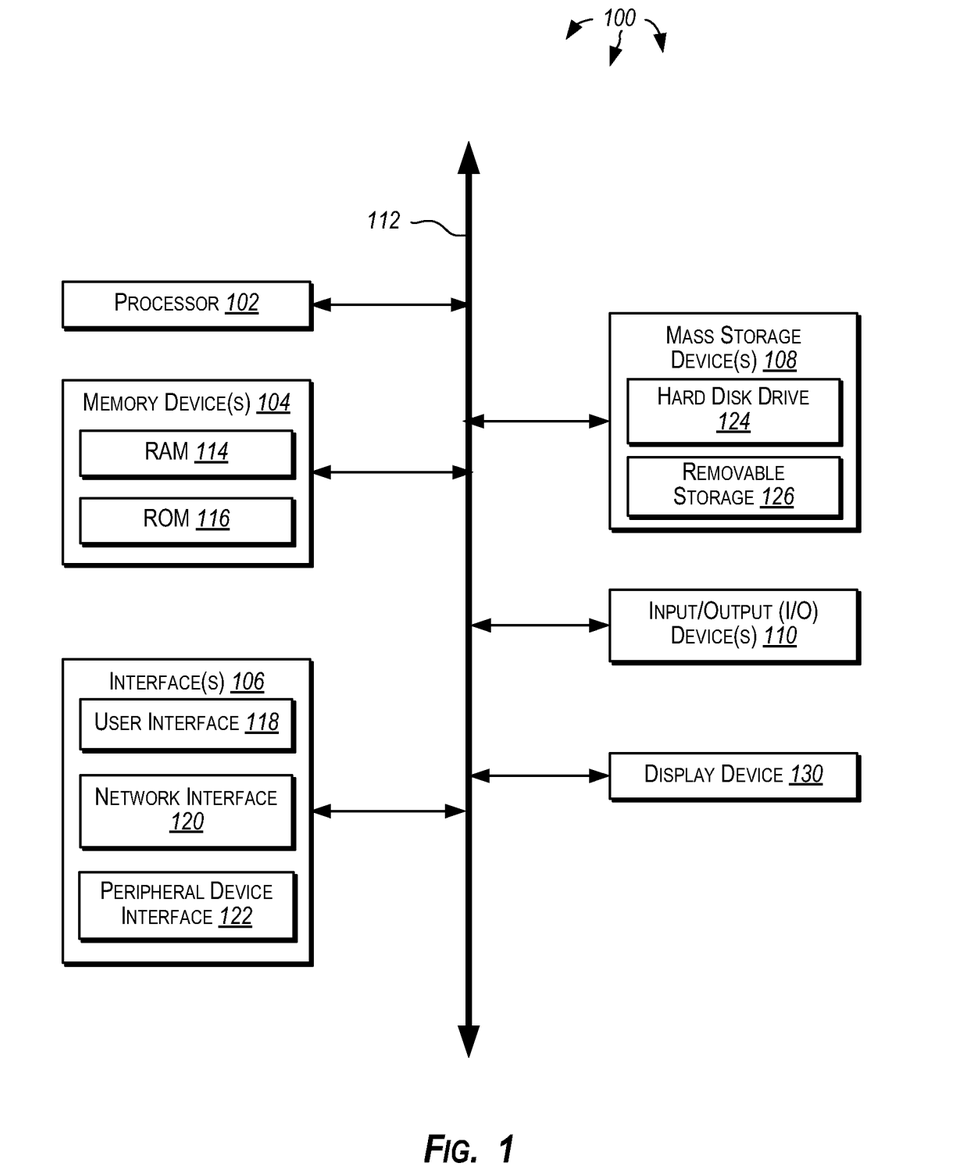
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Aspects of the invention include data requirements extraction and automated modeling that use a combination of data virtualization, data analytics, extract, transform, and load (ETL), web crawlers, reverse engineering systems, along with other technologies to develop an item model. A model owner feeds the system the information for locating the facts to be used, and initiating the modeling process. Existing data structures, websites, vendor input, etc. can be described to the import process, and a data model development module develops an item model. The model can be imported into existing modeling tools for viewing, or viewed as XML. Developers can write their code accordingly to allow use of the attribute metadata for displaying attributes.

Figure 2:
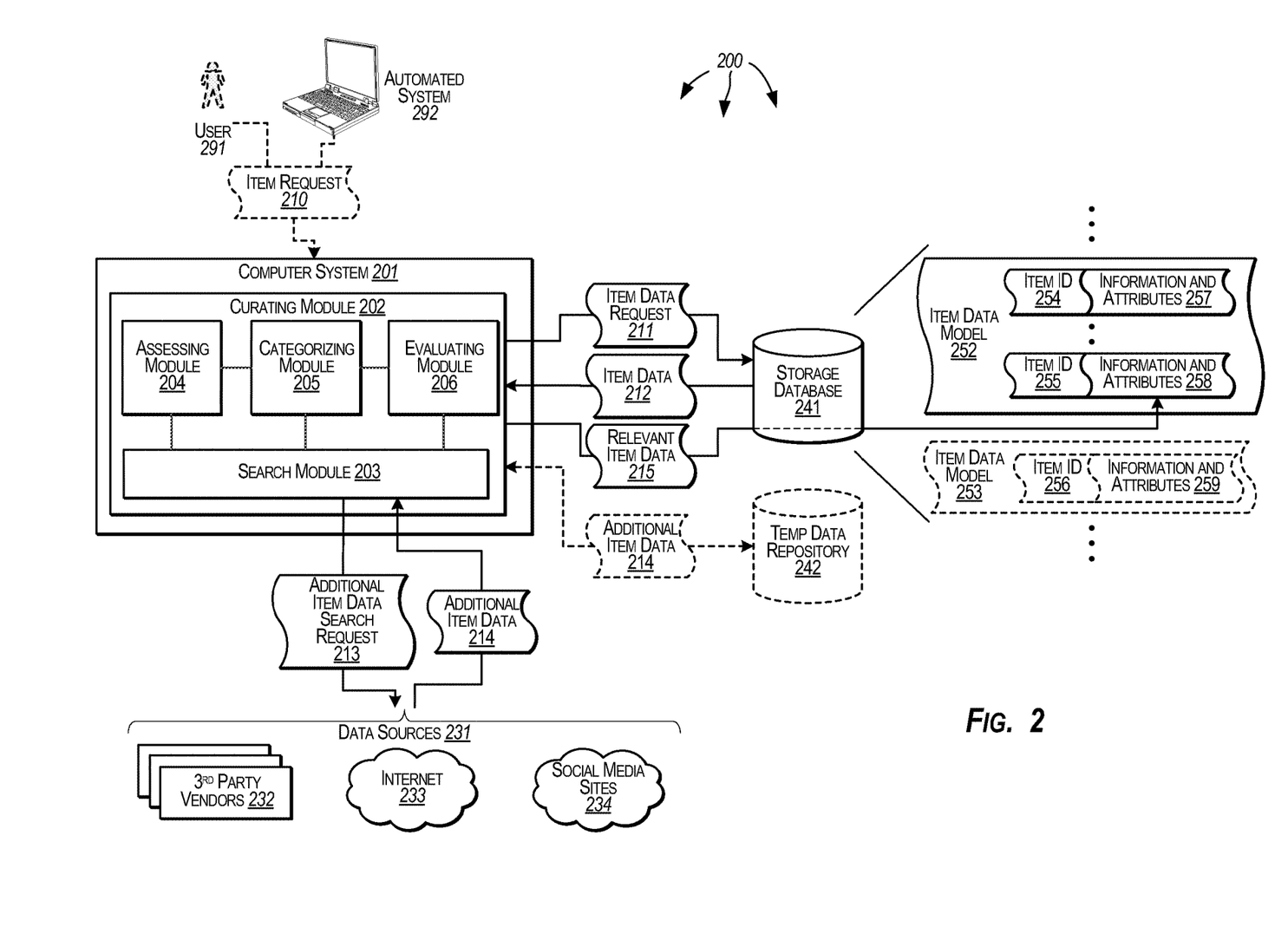
FIG. 2 illustrates an example computer architecture that facilitates developing an item data model for an item.

FIG. 2 illustrates an example computer architecture 200 that facilitates developing an item data model for an item. Referring to FIG. 2, computer architecture 200 includes computer system 201, storage database 241, and data sources 231. Computer architecture 200 can also include temporary data repository 242 and/or automated system 292. Each of the depicted components can be connected to one another over (or be part of) a network, such as, for example, a PAN, a LAN, a WAN, and even the Internet. Accordingly, each of the depicted components as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Computer system 201 can be one or a plurality of computer systems used by one or a plurality of users for the purpose of developing an item data model for an item. Computer system 201 and any other computer systems can be communicatively coupled to data sources 231, storage database 241, data sources 231, and, when appropriate, temporary data repository 242.

As depicted, computer system 201 further includes curating module 202, search module 203, assessing module 204, categorizing module 205, and evaluating module 206.

Curating module 202 is configured to develop item data models. Item data model development can include creating new item data models for items as well as updating existing item data models for items.

Curating module 202 is configured to submit item data requests to storage database 241. For example, curating module 202 can query storage database 241 for an item data model and for any data records and/or fields the item data model may contain. Storage database 241 may contain one or more existing items associated with the item data model. In one aspect, an item data model for an item does not exist. The details and information for the item data model can be returned to curating module 202. Entities and attributes for the item data models can be rationalized (duplicates eliminated, similar attributes combined, etc.) and a master data model can be created. The master data model can serve as a template that can be utilized to further enhance the item data model.

Search module 203 is configured to utilize information and attributes associated with an item data model to execute additional item data search requests against data sources 231. Additional item data search requests can be issued to $3^{rd}$ party vendors 232, to Internet 233, to social media sites 234, etc.

Assessing module 204 is configured to assess the value of the information returned from data sources 231 relative to the information already contained in an item data model. Categorizing module 205 is configured to categorize the information returned from data sources 231 and index the information for more efficient retrieval. Similarly, evaluating module 206 is configured to evaluate the information returned from data sources 231 and can generate a (e.g., relevancy) score for returned information.

Storage database 241 is configured to store and maintain information related to item data models. In some aspects, temporary data repository 242 can also store additional item data.

Figure 3:
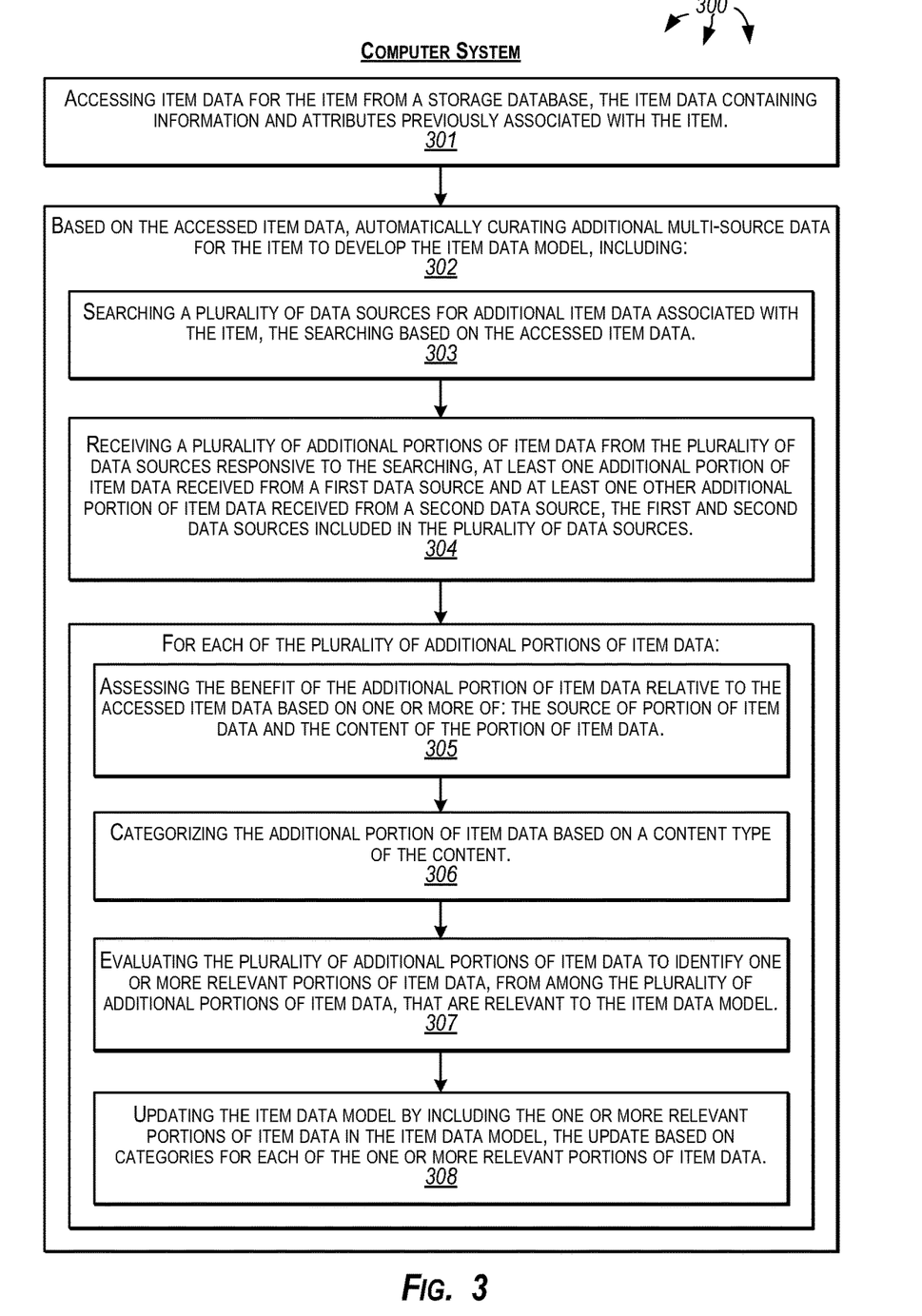
FIG. 3 illustrates a flow chart of an example method for developing an item data model for an item.

FIG. 3 illustrates a flow chart of an example method 300 for developing an item data model for an item. Method 300 will be described with respect to the components and data of computer architecture 200.

Method 300 includes accessing item data for the item from a storage database, the item data containing information and attributes previously associated with the item (301). For example, curating module 202 can access item data 212 from storage database 241. Item data 212 can include information and attributes from one or more of information and attributes 257, 258, etc.

In one aspect, computer system 201 can utilize curating module 202 to submit item data request 211 to storage database 241. Item data request 211 can be a request for item data model 252. Storage database 241 can return item data 212 in response to item data request 211.

Item data model 252 can include one or a plurality of items associated with item data model 252, including item ID 254 and information and attributes 257 thru item ID 255 and information and attributes 258. For example, item data model 252 may contain data associated with coffee makers. Information and attributes 257 can include data for one style of coffee maker, such as, for example, manufacturing or vendor specifications, item images and/or videos, customer reviews, item availability, etc. Information and attributes 258 can contain similar details for a different style of coffee maker. Storage database 241 can return item data 212 from item data model 252 to curating module 202.

In some aspects, curating module 202 issues item data request 211 in response to item request 210 issued by user 291. In other aspects, curating module 202 issues item data request 211 in response to item request 210 issued by automated system 292. For example, automated system 292 can initiate item request 210 following a schedule, such as hourly, daily, weekly, monthly etc.

In some aspects, item data request 211 may be for a request an item data model which may not have a record defined for the item. In such a case, a new record for the item, item data model 253, can be created as a placeholder. Item data model 253 can have an item ID 256 and information and attributes 259. The fields of item data model 253 can be populated by subsequent activities of curating module 202.

Method 300 includes, based on the accessed item data, automatically curating additional multi-source data for the item to develop the item data model (302). For example, curating module 202 can curate additional item data 214 for item ID 255 to develop item data model 252.

Automatically curating additional multi-source data for the item to develop the item data model includes searching a plurality of data sources for additional item data associated with the item, the searching based on the accessed item data (303). For example, in response to receiving item data 212, curating module 202 can utilize search module 203 to issue additional item data search request 213. Additional item data search request 213 can initiate a search of data sources 231 (including one or more of $3^{rd}$ party vendors 232, internet 233, and social media sites 234) for additional item data associated with item ID 255.

In one aspect, curating module 202 can utilize the item name, the item description, key terms and phrases associated with item data model 252, etc. as the search terms and parameters utilized by search module 203 to construct additional item data search request 213. Search module 203 can submit additional item data searched request 213 to data sources 231. In response, data sources 231 can return additional item data 214 to search module 203.

Search module 203 can perform a single search or multiple searches using one or more pieces of data associated with item data model 252. For example, additional item data search request 213 may be a single search, utilizing a single term, to a single website found on internet 233. On the other hand, additional item data search request 213 may be a plurality of searches, using various combinations of search terms, to various combinations of $3^{rd}$ party vendors 232, internet 233, and/or social media sites 234.

Automatically curating additional multi-source data for the item to develop the item data model includes receiving a plurality of additional portions of item data from the plurality of data sources responsive to the searching, at least one additional portion of item data received from a first data source and at least one other additional portion of item data received from a second data source, the first and second data sources included in the plurality of data sources (304). For example, search module 203 can receive additional item data 214 from data sources 231. Additional item data 214 can come from one or more different data sources. For example, one portion of additional item data can be received from a $3^{rd}$ party vendor 232, another portion of additional item data can be received from Internet 233, and a further portion of additional item data can be received from a social media site 234.

When appropriate, curation module 202 can temporarily store additional item data 214 in temporary data repository 242.

For each of the plurality of additional portions of item data, method 300 includes, assessing the benefit of the additional portion of item data relative to the accessed item data based on one or more of: the source of portion of item data and the content of the portion of item data (304). For example, assessing module 204 can assess the benefit of each portion of item data included in additional item data 214 based on one or more of: the source of additional item data 214 and the content of additional item data 214.

Other measures of benefit (or relevancy) can also be utilized for each portion of item data in additional item data 214. For example, each portion of item data can be assessed based on: (1) relativity—how applicable is the portion of item data to item data model 252 based upon an exact match, similar match, or fuzzy match; (2) authority—is the portion of item data in from a responsible source, a trusted expert source, a wiki source, or an unknown source; (3) legitimacy—is the portion of item data presented as descriptive, prescriptive, satirical, etc.; (4) what is the historical accuracy or age of the portion of item data—was the portion of item data published within the last several years, within the last several months, or within the last several weeks, etc. or is it about a future state of the item data model 252; and (5) reputation—is the portion of item data from a source known to do research which is reliable and trusted, from a business site, or from a wiki site, etc.

For each of the plurality of additional portions of item data, method 300 includes categorizing the additional portion of item data based on a content type of the content (305). For example, categorizing module 205 can categorize each portion of item data in additional item data 214, based on the content type of portion of item data.

For example, each portion of item data in additional item data 214 can be categorized based on: (1) unstructured data—is the portion of item data an image, video, diagram, chart, or other visual representation of the entity; (2) description—is the portion of item data descriptive in nature (e.g. a box is a container that can hold things); (3) specification—is the portion of item data a specification (e.g. a box is 12"×12"×12" of brown corrugated cardboard); (4) values—does the portion of item data describe the different types or values the entity can be (e.g. gender is male, female, or unknown); (5) limitations—does the portion of item data describe ranges or boundaries for the entity (e.g. dependence is a positive number from 0 to 100); and (6) correlation/association—does the portion of item data describe something that can be correlated and/or associated (e.g. a contact has an address, phone number, etc.).

For each of the plurality of additional portions of item data, method 300 includes, evaluating the plurality of additional portions of item data to identify one or more relevant portions of item data, from among the plurality of additional portions of item data, that are relevant to the item data model (306). For example, evaluating module 206 can evaluate each portion of item data in additional item data 214 to identify one or more relevant portions of item data in additional item data 214 that are relevant to item data model 252.

For example, each portion of item data in item data 214 can be evaluated based on: (1) duplication—does the portion of item data in already exist in the system; (2) completeness—how many different fields and/or parts does the portion of item data contain (e.g. image, description, specifications, other details, etc.); (3) misinformation—is t the portion of item data contradictory to prior information, ridiculous compared to other information, out of character determined from machine learning, etc.; and (4) historical assessment—is the portion of item data up to date, describing a future state, etc.

For each of the plurality of additional portions of item data, method 300 includes updating the item data model by including the one or more relevant portions of item data in the item data model, the update based on categories for each of the one or more relevant portions of item data (307). For example, curating module 202 can update information and attributes 258 with relevant item data 215. Relevant item data 215 can include one or more portions of item data from additional item data 214 identified as relevant by evaluating module 206.

Figure 4:
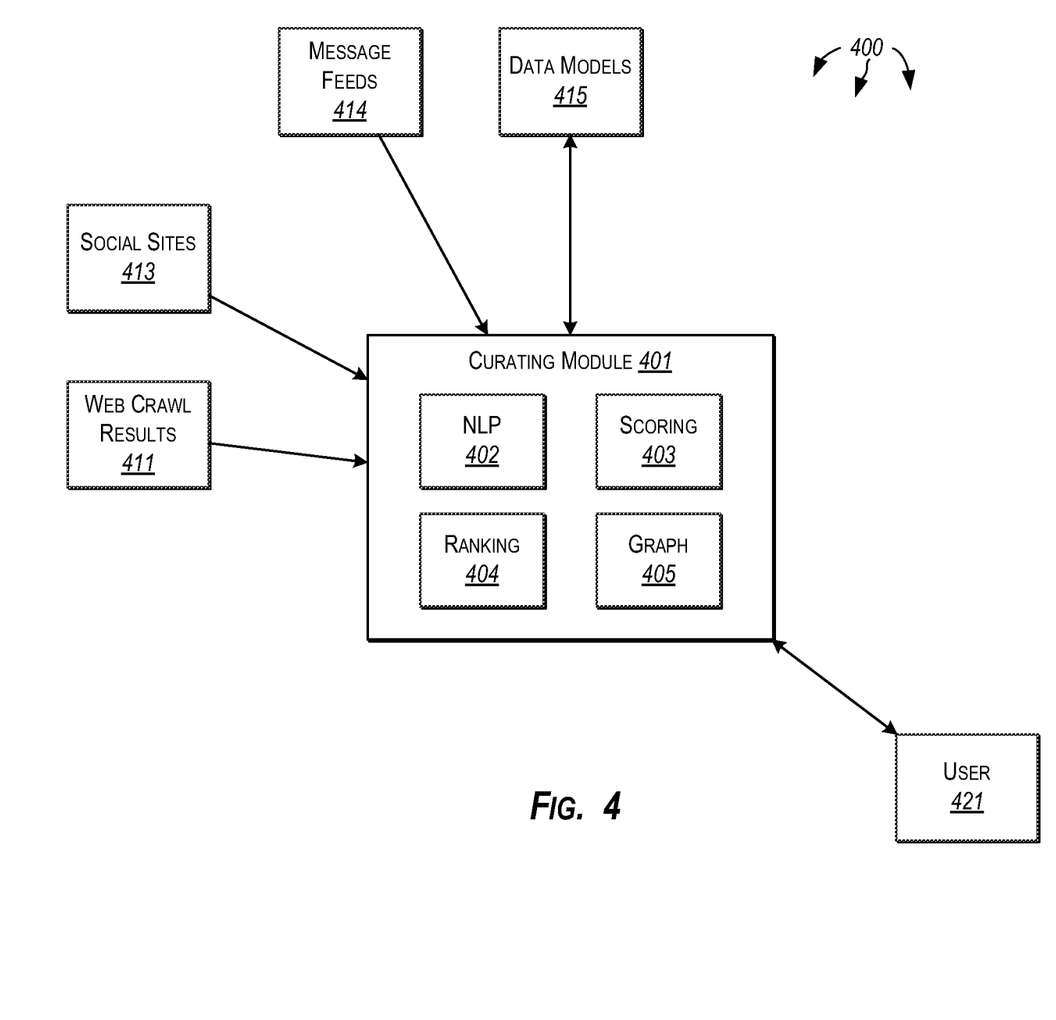
FIG. 4 illustrates an example computer architecture for use in developing an item data model for an item.

FIG. 4 illustrates an example computer architecture 400 for use in developing an item data model for an item. As depicted, computer architecture 400 includes curating module 401, web crawl results 411, social sites 413, message feeds 414, and data models 415. Curating module 401 further includes NLP 402 (neuro-linguistic programming), scoring 403, ranking 404, and graph 405.

In general, curating module 401 can include functionality similar to curating module 202. Curating module 401 is configured to develop item data models. Item data model development can include creating new item data models for items as well as updating existing item data models for items.

NLP 402 can include functionality similar to search module 203. NLP 402 is also configured to identify and convert text identifier references to text-based information in a given text. NLP 402 can then collect meaningful content and context from the referenced information. NLP 402 can read a given body of text to identify references to other bodies of text. The newly found bodies of text are also read for references. Each of the bodies of text is also read for meaningful content and context.

When reading for meaningful content and context, a body of text can be segmented by paragraph, clause, passage or other appropriate grouping of sentences. The order of the sentence groupings is captured and relationships between groupings based on order can be created. Each sentence is identified and term order can be captured and relationships created. Each sentence is read and relevant terms (e.g., nouns, verbs, and adjectives) are identified along with the role each term plays in the sentence.

The terms' order and proximity to one another are useful to the meaning of the entire sentence. As such, a relationship can be created between each term and all other terms in the sentence capturing their order and proximity to one another. Sentence groupings, sentences, terms and relationships can be stored in a graph database. Storage in a graph database allows for querying and traversal of the objects through their relationships to discovery meaning and context of each term. Storing the content as a graph also allows for identifying patterns of term usage and querying for like patterns to discover where the same term is used in the same context but in different bodies of text.

Scoring 403 can include functionality similar to assessing module 204. Scoring 403 is configured to assess the value of the information returned from web crawl results 411, social sites 413, and message feeds 414, etc. relative to the information already contained in item data model 415.

Ranking 404 can include functionality similar to evaluating module 206. Ranking 404 is configured to evaluate the information returned from web crawl results 411, social sites 413, and message feeds 414, etc. and generate a (e.g., relevancy) score for returned information.

Graph 405 can include functionality similar to categorizing module 205. Graph 405 is configured to categorize the information returned from web crawl results 411, social sites 413, and message feeds 414, etc. and index the information for more efficient retrieval.

In one aspect, a web-crawler search parses through each website found using keywords found in an item file data, and extends the knowledge base. Ratings, features, etc. can be gathered and included in the data model. Item documentation from the manufacturer and supplier (images, decryptions, specifications, variations, warranty, support, parts, and supplies) can be imported and parsed for other descriptive information to be collected. Sentiment about the item can also be retrieved from social media sites 413 (e.g., Facebook®) and message feeds 414 (e.g., Twitter®).

Figure 5:
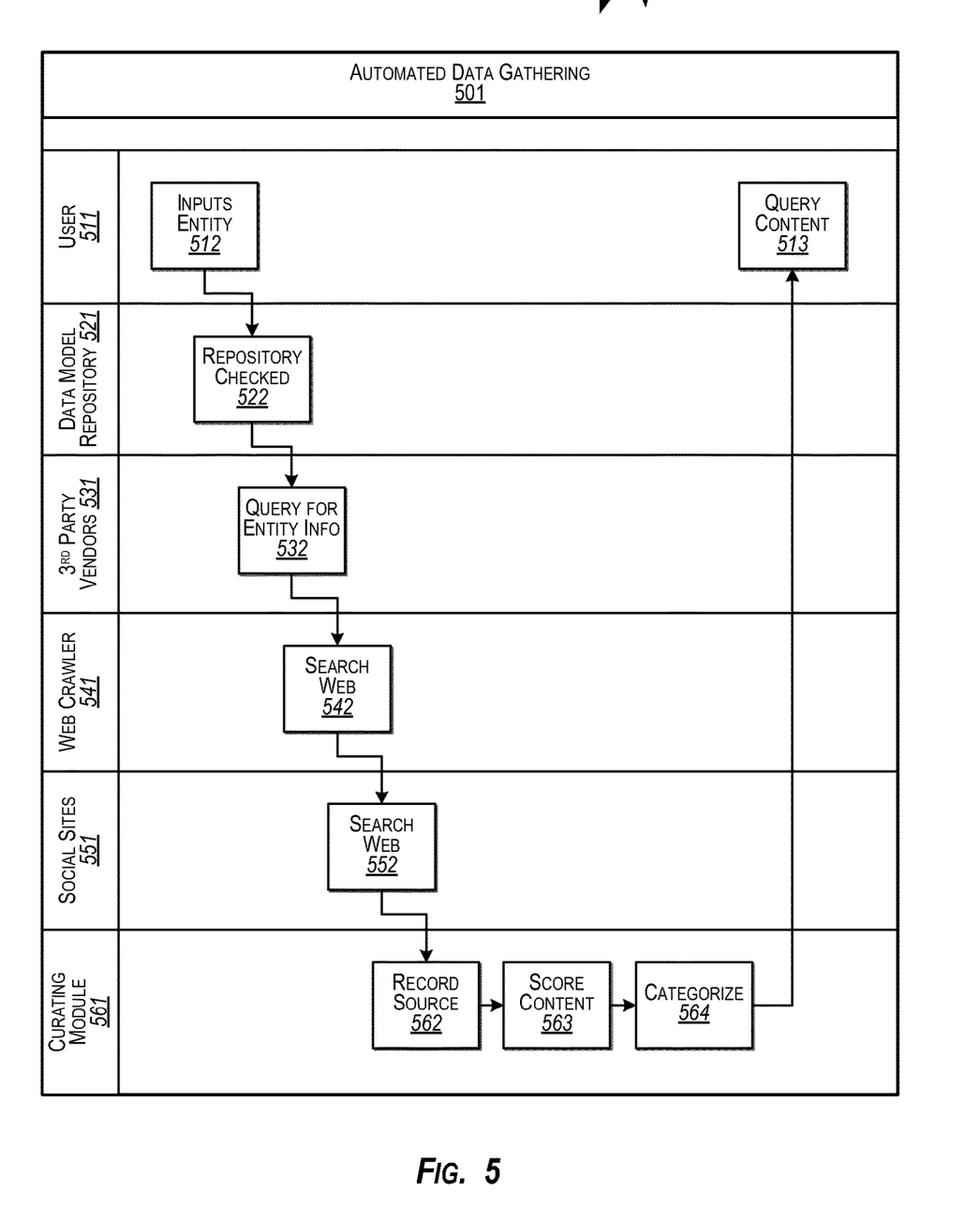
FIG. 5 illustrates an example data flow for developing an item data model for an item.

FIG. 5 illustrates an example data flow 500 for developing an item data model for an item. Data flow 500 includes a number of activities performed across user 511, data model repository 521, $3^{rd}$ party vendors 531, web crawler 541, social sites 551, and curating module 561 for automated data gathering 501.

Inputs entity 512 is input by user 511. User 511 initiates a request for an item data model. For example, the input request can be for an item data model for a basketball, a tent, a dress, a microwave oven, etc.

Repository checked 522 is executed at data model repository 521. For example, data model repository 521 can be queried to determine the information and attributes already contained for the item that has been requested.

Query for entity info 532 is executed at $3^{rd}$ party vendors 531. For example, information can be requested from 3rd party vendors who participate in information sharing on item data values. Information can be retrieved via secure file transfer protocol (SFTP), web line for uploading, and/or manually interred printed materials (which are scanned and converted into images and data from OCR read).

Search web 542 is executed at web crawler 541. For example, Web-crawler 541 can parse through each website found using keywords found in an item file data, and extend the knowledge base. Ratings, features, etc. can be gathered and included in a data model. Item documentation from the manufacturer and supplier (images, decryptions, specifications, variations, warranty, support, parts, and supplies) can be imported and parsed for other descriptive information to be collected.

Search web 552 is executed at social sites 551. For example, sentiment data can be retrieved from Twitter, Facebook, or other social media data feeds based upon the entity and/or entity description.

In general, curating module 561 can include functionality similar to curating module 201. Record source 562 is executed at curating module 561. For example, the source of the information can be tracked by crediting and recording the URL. Score content 563 is executed at curating module 561. Scores are accumulated to present an overall profile of the information. Score content 563 consists of assessing each portion of item data based on one or more of: relativity, authority, legitimacy, historical accuracy or age, and reputation (as described). Categorize 564 is executed at curating module 561. Categorize 564 consists of categorizing additional item data based on one or more of: unstructured data, description, specification, values, and limitations (as described).

Query content 513 is returned to user 511. User 511 can request information based upon scores and categories of scores. For example, vendor information may or may not be important or a user may or may not be interested in unstructured information associated with an item.

Figure 6:
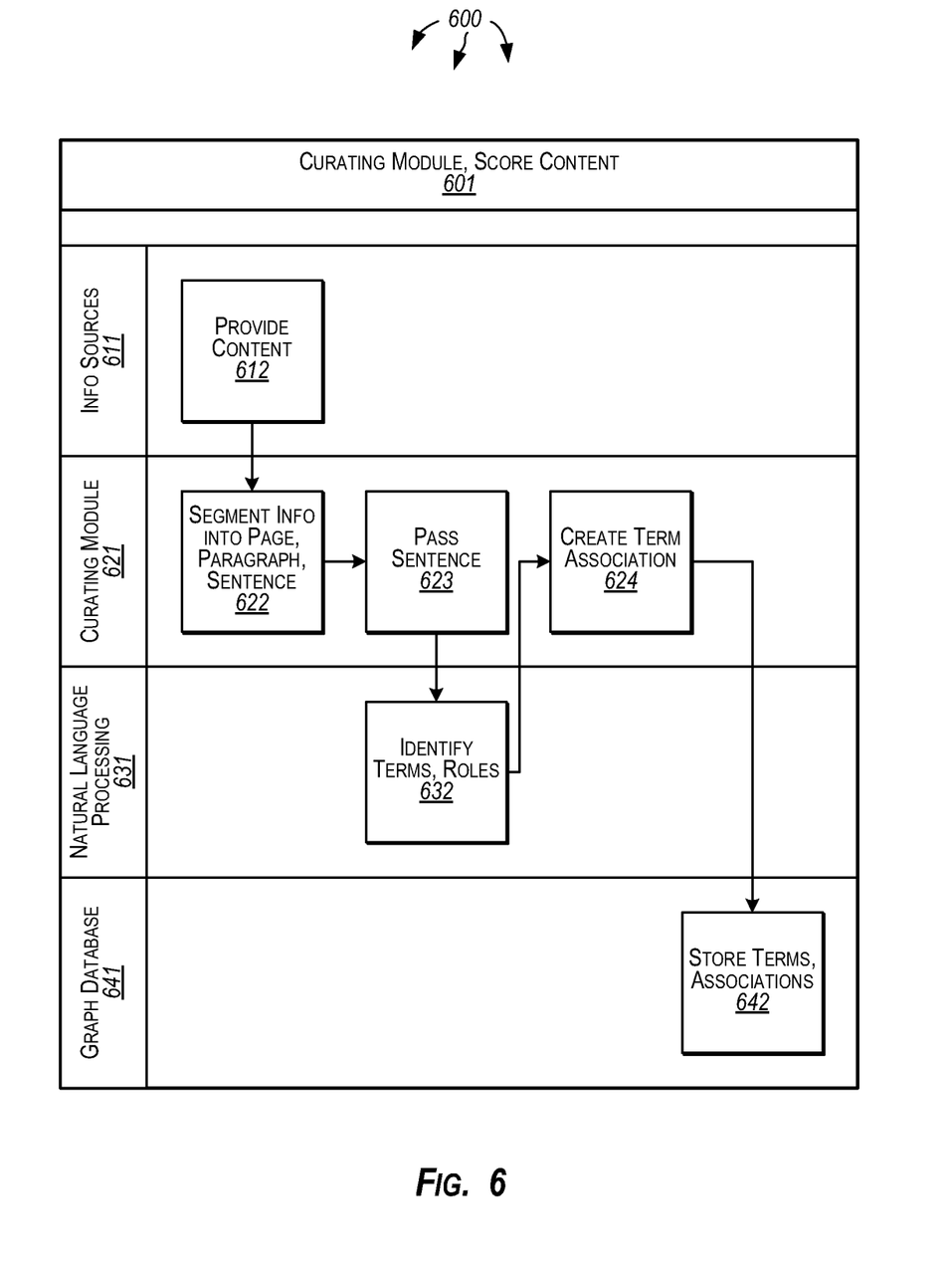
FIG. 6 illustrates an example data flow for parsing verbiage used to describe an item.

FIG. 6 illustrates an example data flow 600 for parsing verbiage used to describe an item. Data flow 600 includes a number of activities performed across info sources 611, curating module 621, natural language processing 631, graph database 641 for curating module, score content 601.

Provide content 612 is executed at information sources 611. For example, a given body of text can be read to identify references to other bodies of text. The newly found bodies of text are then also read for references. Each of the bodies of text is also read for meaningful content and context.

In general, curating module 621 can include functionality similar to curating module 201. Segment info into page, paragraph, sentence 622 is executed at curating module 621. For example, when reading for meaningful content and context, a body of text is segmented by paragraph, clause, passage or other significant grouping of sentences. The order of the sentence groupings is captured and relationships between groupings based on order are created. Each sentence of each sentence grouping is identified and, similar to sentence groupings, order is captured and relationships are created.

Pass sentence 623 is executed at curating module 621 to pass sentences to natural language processing 631. Identify terms, roles 632 is executed by natural language processing 631. For example, terms and roles can be identified in sentences passed in from curating module 621

Create term association 624 is executed at curating module 621. For example, each sentence is read and appropriate terms (nouns, verbs and adjectives) are identified along with the role each term plays in the sentence. The terms' order and proximity to one another are critical to the meaning of the entire sentence. As such, an association is created between each term and all other terms in the sentence capturing their order and proximity to one another.

Store terms, associations 642 is executed at graph database 641. Sentence groupings, sentences, terms and associations can be stored in graph database 641. Storing sentence groupings, sentences, terms and associations allows for querying and traversal of the objects through their relationships. As such, querying and traversal can be used to discover meaning and context of each term. Storing the content as a graph also allows for identifying patterns of term usage and querying for like patterns to discover where the same term is used in the same context but in different bodies of text.

Figure 7:
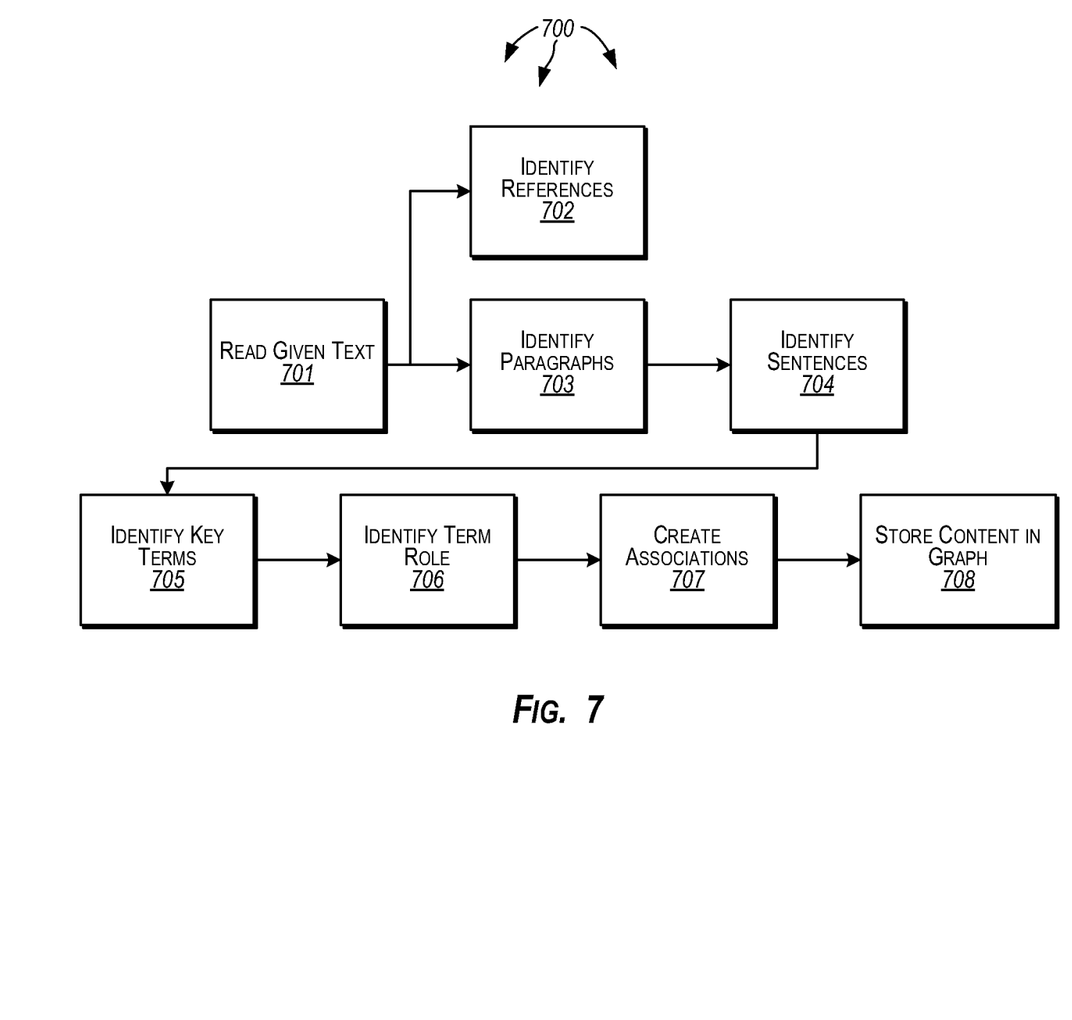
FIG. 7 illustrates an example data flow chart for parsing verbiage used to describe an item.

FIG. 7 illustrates an example data flow 700 for parsing verbiage used to describe an item. In general, data flow 700 can be used to identify references to text-based information in a given text and then collect meaningful content and context from the referenced information. When reading for meaningful content and context the body of text can be segmented by paragraph, clause, passage or other significant grouping of sentences. The order of the sentence groupings is captured and relationships between groupings based on order are created. Each sentence of each sentence grouping is identified and, similar to sentence groupings, order is captured and relationships are created.

Data flow 700 includes read given text 701 A given body of text can be read to identify references to other bodies of text. The newly found bodies of text are also read for references. Each of the bodies of text is also read for meaningful content and context.

Data flow 700 includes identify references 702. For example, the source of the given text can be tracked by crediting and recording a URL.

Data flow 700 includes identify paragraphs 703, identify sentences 704, and identify key terms 705. For example, paragraphs, sentences, and key terms can be identified from the given text. Each sentence is read and key terms are identified along with the role each term plays in the sentence. In one aspect, identify paragraphs 703, identify sentences 704, and identify key terms 705 define more specific operations similar to segment info into page, paragraph, sentence 622.

Data flow 700 includes identify term role 706. The terms' order and proximity to one another within a sentence can be identified Term order and proximity within a sentence can be used in determining the meaning of the sentence.

Data flow 700 includes create associations 707. Associations can be created between each term and all other terms in a sentence capturing their order and proximity to one another.

Data flow 700 includes store content in graph 708. For example, sentence groupings, sentences, terms and relationships can be stored in a graph database. Storing sentence groupings, sentences, terms and relationships in a graph database allows for querying and traversal of the objects through their relationships. Query and traversal can be used to discovery meaning and context of each term. Storing the content as a graph also allows for identifying patterns of term usage and querying for like patterns to discover where the same term is used in the same context but in different bodies of text.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method for use at a computer system, the computer system including a processor and system memory, a method for developing an item data model for an item, the method comprising the processor:
   accessing item data for the item from a storage database, the item data containing information and attributes previously associated with the item;
   based on the accessed item data, automatically curating additional multi-source data for the item to develop the item data model, including:
      rationalizing a master data model using the accessed data item, the master data model defining a template for the item data model;
      in response to receiving the accessed data item and based on at least one populated accessed data item attribute, automatically constructing a targeted additional item data search request, wherein the targeted additional item data search request comprises at least one populated attribute already associated with the accessed item and unassociated with any unpopulated attribute;
      searching a plurality of data sources for additional item data associated with the item with the targeted search request;
      receiving a plurality of additional portions of item data from the plurality of data sources responsive to the searching, at least one additional portion of item data received from a first data source and at least one other additional portion of item data received from a second data source, the first and second data sources included in the plurality of data sources; and
      for each of the plurality of additional portions of item data:
         assessing the benefit of the additional portion of item data relative to the accessed item data based on one or more of: the source of portion of item data and the content of the portion of item data,
         automatically categorizing the additional portion of item data based on a content type of the content and automatically indexing the additional portion of item data for retrieval by the processor,
         evaluating the plurality of additional portions of item data to identify one or more relevant portions of item data, from among the plurality of additional portions of item data, that are relevant to the item data model, and based on the master data model, and
         updating the item data model by including the one or more relevant portions of item data in the item data model, the update based on categories for each of the one or more relevant portions of item data.

2. The method of claim 1, wherein searching a plurality of data sources for additional item data associated with the item comprises accessing additional items data from a 3$^{rd}$ party vendor that participates in item data sharing.

3. The method of claim 1, wherein searching a plurality of data sources for additional item data associated with the item comprises using web search tools to search for additional item data.

4. The method of claim 1, wherein searching a plurality of data sources for additional item data associated with the item comprises searching the Internet for additional item data.

5. The method of claim 1, wherein searching a plurality of data sources for additional item data associated with the item comprises searching social media for user sentiment associated with the item.

6. The method of claim 1, further comprising storing the plurality of additional portions of item data in a temporary holding database.

7. The method of claim 6, further comprising automatically crediting and recording the sources of the additional received item data in the temporary holding database.

8. The method of claim 6, further comprising automatically eliminating redundancies in the additional received item data from the temporary holding database for the item.

9. The method of claim 6, wherein updating the item data model by including the one or more relevant portions of item data in the item data model, comprises aggregating the one or more relevant portions of item data from the temporary holding database into the storage database.

10. The method of claim 1, wherein, for each of the plurality of additional portions of item data, assessing the benefit of the additional portion of item data relative to the accessed item comprises calculating a weighting score for the additional portion of item data based on one or more of: the relativity of the additional portion of item data, the legitimacy of the additional portion of item data, the authority of the source of the additional portion of item data, the reputation of the source of the additional portion of item data, and the age of the additional portion of item data.

11. The method of claim 1, wherein, for each of the plurality of additional portions of item data, categorizing the additional portion of item data comprises categorizing the additional portion of data as one of: an unstructured object, a description, a specification, a value, or a limitation.

12. The method of claim 1, wherein evaluating the plurality of additional portions of item data comprises performing one or more of: a duplication assessment, a completion assessment, a misinformation assessment, and historical assessment on the plurality of additional portions of data.

13. A computer system, the computer system comprising:
   one or more processors;
   system memory;
   a curation module, using the one or more processors, configured to:
      access item data for the item from a storage database, the item data containing information and attributes previously associated with the item;
      based on the accessed item data, automatically curate additional multisource data for the item to develop the item data model, including:
         rationalize a master data model using the accessed data item, the master data model defining a template for the item data model;
         receive a plurality of additional portions of item data from the plurality of data sources responsive to a targeted additional item data search request of the plurality of data sources constructed in response to receiving the accessed data item and based on at least one populated accessed data item attribute, wherein the targeted additional item data search request comprises at least one populated attribute already associated with the accessed item and unassociated with any unpopulated attribute, at least one additional portion of item data received from a first data source and at least one other additional portion of item data received from a second data source, the first and second data sources included in the plurality of data sources; and for each of the plurality of additional portions of item data:
assess the benefit of the additional portion of item data relative to the accessed item data based on one or more of: the source of portion of item data and the content of the portion of item data,
automatically categorize the additional portion of item data based on a content type of the content and automatically indexing the additional portion of item data for retrieval by the one or more processors,
evaluate the plurality of additional portions of item data to identify one or more relevant portions of item data, from among the plurality of additional portions of item data, that are relevant to the item data model, and based on the master data model, and
update the item data model by including the one or more relevant portions of item data in the item data model, the update based on categories for each of the one or more relevant portions of item data.

14. The computer system of claim 13, wherein a curation module, using the one or more processors, configured to assess the benefit of the additional portion of item data relative to the accessed item comprises a curation module, using the one or more processors, configured to calculate a weighting score for the additional portion of item data based on one or more of: the relativity of the additional portion of item data, the legitimacy of the additional portion of item data, the authority of the source of the additional portion of item data, the reputation of the source of the additional portion of item data, and the age of the additional portion of item data.

15. The computer system of claim 13, wherein a curation module, using the one or more processors, configured to categorize the additional portion of item data comprises a curation module, using the one or more processors, configured to categorize the additional portion of data as one of: an unstructured object, a description, a specification, a value, or a limitation.

16. The computer system of claim 13, wherein a curation module, using the one or more processors, configured to evaluate the plurality of additional portions of item data comprise a curation module, using the one or more processors, configured to perform one or more of: a duplication assessment, a completion assessment, a misinformation assessment, and historical assessment on the plurality of additional portions of data.

17. A computer program product for use at a computer system, the computer program product for implementing a method for developing an item data model for an item, the computer program product comprising one or more computer storage devices having stored thereon computer-executable instructions that, when executed at a processor, cause the computer system to perform the method, including:

access item data for the item from a storage database, the item data containing information and attributes previously associated with the item;
based on the accessed item data, automatically curate additional multi-source data for the item to develop the item data model, including:
rationalize a master data model using the accessed data item, the master data model defining a template for the item data model;
in response to receiving the accessed data item and based on at least one populated accessed data item attribute, automatically construct a targeted additional item data search request, wherein the targeted additional item data search request comprises at least one populated attribute already associated with the accessed item and unassociated with any unpopulated attribute;
search a plurality of data sources for additional item data associated with the item with the targeted search request;
receive a plurality of additional portions of item data from the plurality of data sources responsive to the searching, at least one additional portion of item data received from a first data source and at least one additional portion of item data received from a second data source, the first and second data sources included in the plurality of data sources;
for each of the plurality of additional portions of item data:
assess the benefit of the additional portion of item data relative to the accessed item data based on one or more of: the source of portion of item data and the content of the portion of item data,
automatically categorize the additional portion of item data based on a content type of the content and automatically index the additional portion of item data for retrieval by the processor,
evaluate the plurality of additional portions of item data to identify one or more relevant portions of item data, from among the plurality of additional portions of item data, that are relevant to the item data model, and based on the master data model, and
update the item data model by including the one or more relevant portions of item data in the item data model, the update based on categories for each of the one or more relevant portions of item data.

18. The computer program product of claim 17, wherein computer-executable instructions that, when executed, cause the computer system to search a plurality of data sources for additional item data associated with the item comprise computer-executable instructions that, when executed, cause the computer system to access additional items data from a 3rd party vendor that participates in item data sharing.

19. The computer program product of claim 17, wherein computer-executable instructions that, when executed, cause the computer system to search a plurality of data sources for additional item data associated with the item comprise computer-executable instructions that, when executed, cause the computer system to use web search tools to search the Internet for additional item data.

20. The computer program product of claim 17, wherein computer-executable instructions that, when executed, cause the computer system to search a plurality of data sources for additional item data associated with the item comprise computer-executable instructions that, when executed, cause the computer system to search social media for user sentiment associated with the item.

\* \* \* \* \*